(12) United States Patent
Waldron

(10) Patent No.: US 12,271,292 B2
(45) Date of Patent: Apr. 8, 2025

(54) LOG-BASED AUTOMATION TESTING

(71) Applicant: T-Mobile USA, Inc., Bellevue, WA (US)

(72) Inventor: Michael Waldron, Denver, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 173 days.

(21) Appl. No.: 17/953,187

(22) Filed: Sep. 26, 2022

(65) Prior Publication Data

US 2023/0013028 A1    Jan. 19, 2023

Related U.S. Application Data

(63) Continuation of application No. 17/187,200, filed on Feb. 26, 2021, now Pat. No. 11,494,292.

(51) Int. Cl.
*G06F 11/36* (2006.01)
*G06F 11/34* (2006.01)
*G06F 11/3668* (2025.01)

(52) U.S. Cl.
CPC ...... *G06F 11/3684* (2013.01); *G06F 11/3438* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 6,427,000 B1 * | 7/2002 | Mumford | H04M 3/51 706/920 |
| 6,804,796 B2 * | 10/2004 | Gustavsson | G06F 11/3692 717/124 |
| 7,278,056 B2 | 10/2007 | Hekmatpour | |
| 7,627,821 B2 * | 12/2009 | Klementiev | G06F 9/45512 715/704 |
| 9,405,665 B1 * | 8/2016 | Shashi | G06F 11/3664 |
| 9,886,366 B2 | 2/2018 | Topiwala et al. | |
| 11,494,292 B2 * | 11/2022 | Waldron | G06F 11/3692 |
| 2002/0184575 A1 * | 12/2002 | Landan | G06F 11/3414 714/E11.193 |

(Continued)

OTHER PUBLICATIONS

He, "Detecting session boundaries from Web user logs", 2013, ResearchGate (Year: 2013).*

(Continued)

*Primary Examiner* — Hossain M Morshed
(74) *Attorney, Agent, or Firm* — Lee & Hayes, P.C.

(57) ABSTRACT

A testing engine and/or other machine learning and artificial intelligence evaluates one or more user activity logs associated with one or more users and/or one or more software applications or apps. The testing engine generates one or more testing scripts based on one or more sequences of activities in the one or more user activity logs. Such testing scripts may then be used to perform one or more tests, such as using a testing automation framework and/or engine. In various examples, evaluating the one or more user activity logs and/or generating one or more testing scripts may involve categorizing one or more users, activities, and/or user activity logs; consolidating one or more users, activities, and/or user activity logs; modifying one or more user activity logs; and so on.

20 Claims, 12 Drawing Sheets

(56) References Cited

U.S. PATENT DOCUMENTS

| | | | |
|---|---|---|---|
| 2005/0216235 A1* | 9/2005 | Butt | G06F 11/3457 |
| | | | 702/186 |
| 2005/0234708 A1* | 10/2005 | Meehan | G06F 8/20 |
| | | | 706/55 |
| 2011/0004868 A1* | 1/2011 | Bharadwaj | G06F 11/3676 |
| | | | 717/124 |
| 2014/0040667 A1* | 2/2014 | Zemer | G06F 11/3684 |
| | | | 714/E11.178 |
| 2015/0074648 A1* | 3/2015 | Tal | G06F 11/3688 |
| | | | 717/124 |
| 2015/0278076 A1* | 10/2015 | BS | G06F 11/3664 |
| | | | 714/38.1 |
| 2016/0092347 A1* | 3/2016 | Edwards | G06F 11/3684 |
| | | | 717/125 |
| 2018/0239961 A1* | 8/2018 | Ekambaram | G06V 40/20 |
| 2019/0042400 A1* | 2/2019 | Surace | G06F 11/3688 |
| 2019/0188116 A1* | 6/2019 | Roth | G06F 11/3608 |
| 2022/0066902 A1* | 3/2022 | Narra | G16H 20/60 |

OTHER PUBLICATIONS

Montero, "Towards a Method for Automated Testing in Robotic Process Automation Projects", 2019, IEEE (Year: 2019).*
Montero, "Towards a Method for Automated Testing in Robotic Process Automation Projects," IEEE, 2019.

\* cited by examiner

LOG-BASED AUTOMATION TESTING

CROSS-REFERENCE TO RELATED APPLICATION(S)

This application is a continuation patent application of U.S. patent application Ser. No. 17/187,200, filed Feb. 26, 2021 and titled "Log-Based Automation Testing," the disclosure of which is hereby incorporated herein by reference in its entirety.

FIELD

The described embodiments relate generally to testing. More particularly, the present embodiments relate to log-based automation testing.

BACKGROUND

Software applications or apps are constantly being created in the world. Many are developed under rigid time constraints. Such software applications or apps are generally tested before and/or after release. Testing may often be a significant portion of the development activity performed when designing software applications or apps.

Testing software applications or apps may involve the activities of one or more engineers. For example, traditional agile software development may involve multiple cycles of planning, designing, building, testing, reviewing, and launching. Such software development may involve designing tests that evaluate each and every feature of software applications or apps, regardless whether users will eventually and/or commonly use such features.

OVERVIEW

The present disclosure relates to using a testing engine and/or other machine learning and artificial intelligence to evaluate one or more user activity logs associated with one or more users and/or one or more software applications or apps. The testing engine may generate one or more testing scripts based on one or more sequences of activities in the one or more user activity logs. Such testing scripts may then be used to perform one or more tests, such as using a testing automation framework and/or engine. In various examples, evaluating the one or more user activity logs and/or generating one or more testing scripts may involve categorizing one or more users, activities, and/or user activity logs; consolidating one or more users, activities, and/or user activity logs; modifying one or more user activity logs; and so on.

In various embodiments, a method for log-based automation testing includes receiving, using at least one processing unit, at least one user activity log associated with at least one user; determining a category for the at least one user, using the at least one processing unit; and generating, using the at least one processing unit, a testing script for the category using at least the at least one user activity log.

In some examples, the category for the at least one user is determined by evaluating the at least one user. In various examples, the category for the at least one user is determined by analyzing activity in the at least one user activity log. In some implementations of such examples, analyzing the activity includes determining that the activity is statistically similar to category activity for the category.

In a number of examples, the method further includes determining that multiple users associated with multiple user activity logs are associated with the category and consolidating the multiple user activity logs into the at least one user activity log. In some examples, the method further includes generating categories by analyzing multiple user activity logs. In various examples, determining the category for the at least one user includes retrieving a set of categories and comparing the at least one user to the set of categories.

In some embodiments, a method for log-based automation testing includes receiving, using at least one processing unit, user activity logs generated by an application based on interaction with users; selecting a set of the user activity logs to consolidate; consolidating the set of the user activity logs into a consolidated user activity log using the at least one processing unit; and generating, using the at least one processing unit, a testing script based at least on the consolidated user activity log.

In various examples, selecting the set of the user activity logs to consolidate includes determining that each of the set of the user activity logs are statistically similar. In a number of examples, selecting the set of the user activity logs to consolidate includes determining the user activity logs in the set of the user activity logs are all associated with a category. In some examples, selecting the set of the user activity logs to consolidate includes evaluating sequences of actions respectively associated with the set of the user activity logs. In various examples, selecting the set of the user activity logs to consolidate includes comparing an action in a user activity log to an activity threshold.

In some examples, consolidating the set of the user activity logs into the consolidated user activity log includes removing an action. In various examples, consolidating the set of the user activity logs into the consolidated user activity log includes adding an action.

In a number of embodiments, a method for log-based automation testing includes receiving, using at least one processing unit, user activity logs generated by an application based on interaction with users associated with a past event; generating, using the at least one processing unit, a testing script based at least on the user activity logs; generating a stress testing script by modifying the testing script using the at least one processing unit; and using the stress testing script to stress test a system for a future event.

In some examples, modifying the testing script includes determining a category of users associated with a number of the user activity logs, selecting a different number, and modifying the testing script by changing an activity level corresponding to the different number. In a number of implementations of such examples, changing the activity level includes adding an activity to the stress testing script. In some implementations of such examples, changing the activity level includes removing an activity from the stress testing script.

In various examples, modifying the testing script includes determining a category of activity associated with a number of the user activity logs, selecting a different number, and modifying the testing script by changing an amount of the activity corresponding to the different number. In a number of examples, modifying the testing script includes adding duplicate activity from one of the user activity logs to the stress testing script.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
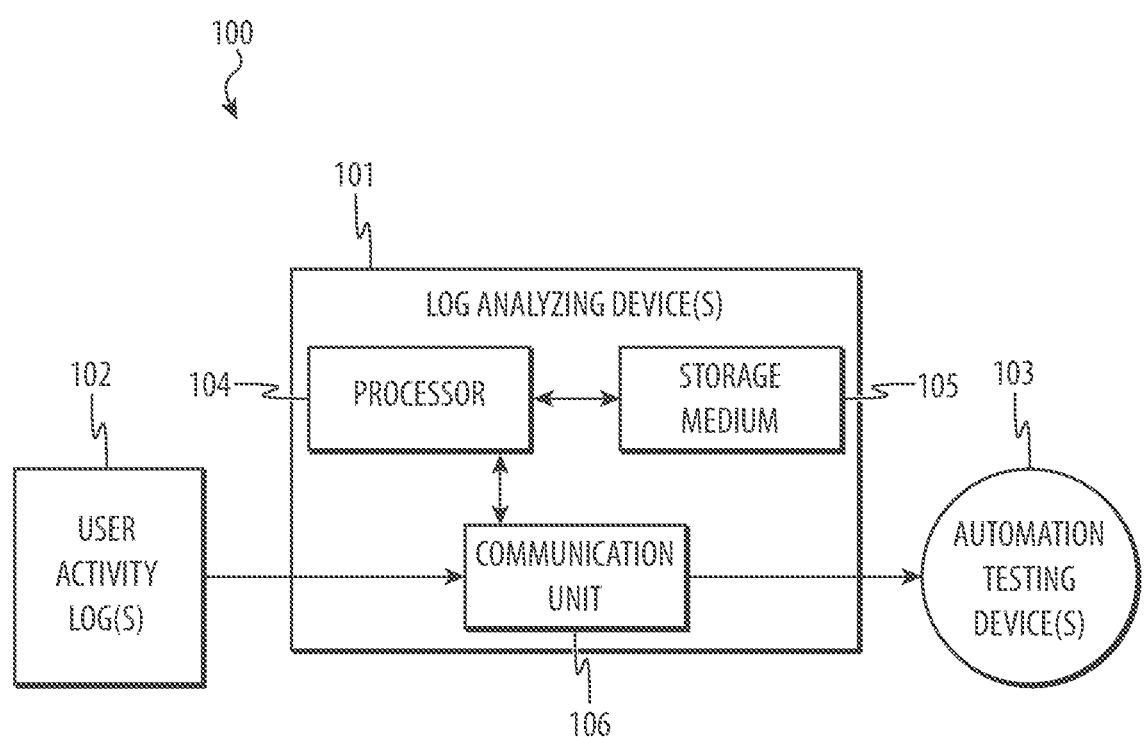
FIG. 1 depicts a first example system for log-based automation testing.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

Testing may be a burdensome and inefficient portion of the software development cycle. Testing designed by testing engineers may not reflect how users use the software, which may expend a great deal of time and effort testing portions of the software that are irrelevant to how users use the software.

In some examples, testing may be performed using a testing automation framework and/or engine, such as Appium. This may improve the efficiency of testing systems, but such testing automation frameworks and/or engines may still involve testing engineers designing testing scripts that may be run by the testing automation framework and/or engine. This may still consume a great deal of time and effort, and may not reflect how users will actually use the software any better than manual testing systems.

The present disclosure may overcome these issues by using a testing engine and/or other machine learning and artificial intelligence to evaluate one or more user activity logs associated with one or more users and/or one or more software applications or apps. The testing engine may generate one or more testing scripts based on one or more sequences of activities in the one or more user activity logs. Such testing scripts may then be used to perform one or more tests, such as using a testing automation framework and/or engine.

In this way, the testing engine and/or other electronic device and/or devices that execute the machine learning and artificial intelligence may be able to design and/or implement testing without involvement of testing engineers. Further, such testing may reflect how users actually use the software and/or may more efficiently test actual use of the software rather than exhaustively testing all features. As a result, this may even improve the operating efficiency and/or hardware and/or software resource consumption of the testing automation framework and/or engine by reducing the amount of testing performed and/or more appropriately focusing testing activities.

Further, the testing engine and/or other machine learning and artificial intelligence may be able to perform testing activities the testing engine and/or other machine learning and artificial intelligence would not previously have been able to perform absent the technology disclosed herein. This may enable the testing engine and/or other machine learning and artificial intelligence to operate more efficiently while consuming fewer hardware and/or software resources as more resource consuming testing techniques could be omitted. Further, redundant testing and/or other components may be omitted while still enabling testing, reducing unnecessary hardware and/or software components and providing greater system flexibility.

In some implementations, the testing engine and/or other machine learning and artificial intelligence may categorize one or more users and/or activities associated with one or more user activity logs. For example, user activity logs associated with users of a streaming and/or other content delivery software application or app may be categorized into the different categories of users who use the streaming and/or other content, such as binge users (users who access numerous episodes of a series in a single session), sports fans, digital video recorder super users (users who record and access a large amount of content using a digital video recorder), channel flippers (users who frequently scroll through a number of content options during a session), and so on. This categorization may be used to generate testing scripts specifically for those categories of users and/or activities. In a number of examples, the testing engine and/or other machine learning and artificial intelligence may categorize using one or more provided categories. In other examples, the testing engine and/or other machine learning and artificial intelligence may statistically and/or otherwise analyze the one or more users, user activity logs, and/or activities associated with one or more user activity logs in order to identify the categories.

In various implementations, the testing engine and/or other machine learning and artificial intelligence may consolidate one or more users and/or activities associated with one or more user activity logs. For example, a group of user activity logs may be consolidated into a single sequence of activities that is used to generate a single testing script (such as by modifying one or more of the user activity logs, modifying one or more testing scripts, and so on) by including one or more activities common to a majority of the user activity logs, removing one or more activities not common to a majority of the user activity logs, replacing one or more activities similar to one or more activities common to a majority of the user activity logs with the one or more activities common to a majority of the user activity logs, and so on. In various examples, user activity logs associated with a same category may be consolidated together, such as for generating testing scripts for different categories using consolidated user activity logs for the different categories.

In a number of implementations, the testing engine and/or other machine learning and artificial intelligence may generate and utilize testing scripts for a group of different user activity logs. For example, the testing engine and/or other machine learning and artificial intelligence may generate a testing script using multiple user activity logs for a past event, such as all and/or a subset of users accessing content during a previous Super Bowl. Such a testing script may be used to stress test a software and/or other system for a future event, such as a subsequent Super Bowl. Such a testing script may also be modified in order to generate a stress testing script, such as by categorizing one or more users and/or activities associated with one or more of the multiple user activity logs used to generate the testing script and generating the stress testing script by changing the number of those users and/or activities reflected in the stress testing script. By way of illustration, the multiple user activity logs associated with the previous Super Bowl may be one million users and the stress testing script may be generated by modifying the stress testing script to reflect two million viewers.

In still other implementations, the testing engine and/or other machine learning and artificial intelligence may generate a testing script using one or more user activity logs associated with one or more users who have reported a complaint and/or other issue. The testing script may then be used to investigate the complaint and/or other issue. Like other testing scripts discussed herein, the testing script may be tested on different hardware configurations, software configurations, platforms, markets, and so on to investigate if the complaint and/or other issue applies to a specific and/or larger group of hardware configurations, software configurations, platforms, markets, and so on. This may enable evaluation of the potential impact of a complaint and/or other issue. In various examples, hardware configurations, software configurations, platforms, markets, and so on may be part of the categorization discussed above.

In one or more implementations, users and/or activities associated with one or more user activity logs may be anonymized. This may allow evaluation of the user activity logs and/or generation of testing scripts based thereon without enabling users and/or user specific information to be identified from such. In some examples, user activity logs may be able to be purged upon request such that such user activity logs are not used for generation of testing scripts and/or other activities where a purge request has been received.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 depicts a first example system 100 for log-based automation testing. The system 100 may include one or more log analyzing devices 101 that may interact with one or more user activity logs 102 and/or one or more automation testing devices 103. The log analyzing device 101 may execute a testing engine and/or other machine learning and artificial intelligence to evaluate the user activity log(s) 102. The log analyzing device 101 may generate one or more testing scripts based on one or more sequences of activities in the user activity log(s) 102. Such testing scripts may then be used to perform one or more tests, such as using a testing automation framework and/or engine (such as Appium) implemented by the automation testing device(s) 103.

In this way, the log analyzing device 101 may be able to design and/or implement testing without involvement of testing engineers. Further, such testing may reflect how users actually use the software and/or may more efficiently test actual use of the software rather than exhaustively testing all features. As a result, this may even improve the operating efficiency and/or hardware and/or software resource consumption of the automation testing device(s) 103 by reducing the amount of testing performed and/or more appropriately focusing testing activities.

Further, the log analyzing device 101 may be able to perform testing activities the log analyzing device 101 would not previously have been able to perform absent the technology disclosed herein. This may enable the log analyzing device 101 to operate more efficiently while consuming fewer hardware and/or software resources as more resource consuming testing techniques could be omitted. Further, redundant testing and/or other components may be omitted while still enabling testing, reducing unnecessary hardware and/or software components and providing greater system flexibility.

In some implementations, the log analyzing device 101 may categorize one or more users and/or activities associated with one or more user activity logs 102. For example, user activity logs 102 associated with users of a streaming and/or other content delivery software application or app may be categorized into the different categories of users who use the streaming and/or other content, such as binge users (users who access numerous episodes of a series in a single session), sports fans, digital video recorder super users (users who record and access a large amount of content using a digital video recorder), channel flippers (users who frequently scroll through a number of content options during a session), and so on. This categorization may be used to generate testing scripts specifically for those categories of users and/or activities. In a number of examples, the log analyzing device 101 may categorize using one or more provided categories. In other examples, the log analyzing device 101 may statistically and/or otherwise analyze the one or more users, user activity logs 102, and/or activities associated with one or more user activity logs 102 in order to identify the categories.

In some examples, the log analyzing device 101 may determine one or more categories by evaluating one or more users associated with one or more user activity logs 102. In other examples, the log analyzing device 101 may determine the one or more categories by analyzing activity in one or more user activity logs 102. By way of illustration, the log analyzing device 101 may determine that the activity is statistically similar to category activity for the category. In still other examples, the log analyzing device 101 may determine one or more categories by analyzing multiple user activity logs 102. In examples where the log analyzing device 101 may generate one or more categories, the log analyzing device 101 may prompt a test engineer or other entity to provide a name, label, or so on for the one or more generated categories. In other examples, the log analyzing device 101 may retrieve a set of categories that has been previously defined and/or stored and compare one or more users, sequences of activities, and/or user activity logs 102 to the set of categories.

In various implementations, the log analyzing device 101 may consolidate one or more users and/or activities associated with one or more user activity logs 102. For example, a group of user activity logs 102 may be consolidated into a single sequence of activities that is used to generate a single testing script (such as by modifying one or more of the user activity logs 102, modifying one or more testing scripts, and so on) by including one or more activities common to a majority of the user activity logs 102, removing one or more activities not common to a majority of the user activity logs 102, replacing one or more activities similar to one or more activities common to a majority of the user activity logs 102 with the one or more activities common to a majority of the user activity logs 102, and so on. In various examples, user activity logs 102 associated with a same category may be consolidated together, such as for generating testing scripts for different categories using consolidated user activity logs 102 for the different categories.

In a number of examples, the log analyzing device 101 may select a set of the user activity logs 102 to consolidate. By way of illustration, the log analyzing device 101 may select a set of the user activity logs 102 to consolidate by determining that each of the set of the user activity logs 102 are statistically similar. By way of another illustration, the log analyzing device 101 may select a set of the user activity logs 102 to consolidate by determining that the user activity logs 102 in the set of the user activity logs 102 are all associated with a category. By way of another illustration, the log analyzing device 101 may select a set of the user activity logs 102 to consolidate by evaluating sequences of actions respectively associated with the set of the user activity logs 102. In yet another illustration, the log analyzing device 101 may select a set of the user activity logs 102 to consolidate by comparing an action in a user activity log to an activity threshold. The log analyzing device 101 may consolidate the set of the user activity logs 102 into a consolidated user activity log 102 by removing an action, adding an action, modifying an action, and so on.

In some examples, the log analyzing device 101 may determine that multiple users associated with multiple user activity logs 102 are associated with a category. The log analyzing device 101 may then consolidate the multiple user activity logs 102 into one or more consolidated user activity logs 102.

In a number of implementations, the log analyzing device 101 may generate and utilize testing scripts for a group of different user activity logs 102. For example, the log analyzing device 101 may generate a testing script using multiple user activity logs 102 for a past event, such as all and/or a subset of users accessing content during a previous Super Bowl. Such a testing script may be used to stress test a software and/or other system for a future event, such as a subsequent Super Bowl. Such a testing script may also be modified in order to generate a stress testing script, such as by categorizing one or more users and/or activities associated with one or more of the multiple user activity logs 102 used to generate the testing script and generating the stress testing script by changing the number of those users and/or activities reflected in the stress testing script. By way of illustration, the multiple user activity logs 102 associated with the previous Super Bowl may be one million users and the stress testing script may be generated by modifying the stress testing script to reflect two million viewers.

In some examples, the log analyzing device 101 may modify a testing script to generate a stress testing script by determining a category of users associated with a number of the user activity logs 102, selecting a different number, and modifying the testing script by changing an activity level corresponding to the different number. In some versions of this example, changing the activity level may include adding an activity to the stress testing script, removing an activity from the stress testing script, adding duplicate activity from one or more of the user activity logs 102 to the testing script, and so on. However, it is understood that this is an example. In other examples, the log analyzing device 101 may utilize these techniques to generate a stress testing script without modifying an existing testing script.

In various examples, the log analyzing device 101 may modify a testing script to generate a stress testing script by determining a category of activity associated with a number of the user activity logs 102, selecting a different number, and modifying the testing script by changing an activity level corresponding to the different number. In some versions of this example, changing the activity level may include adding an activity to the stress testing script, removing an activity from the stress testing script, adding duplicate activity from one or more of the user activity logs 102 to the testing script, and so on. However, it is understood that this is an example. In other examples, the log analyzing device 101 may utilize these techniques to generate a stress testing script without modifying an existing testing script.

In still other implementations, the log analyzing device 101 may generate a testing script using one or more user activity logs 102 associated with one or more users who have reported a complaint and/or other issue. The testing script may then be used to investigate the complaint and/or other issue. Like other testing scripts discussed herein, the testing script may be tested on different hardware configurations, software configurations, platforms, markets, and so on to investigate if the complaint and/or other issue applies to a specific and/or larger group of hardware configurations, software configurations, platforms, markets, and so on. This may enable evaluation of the potential impact of a complaint and/or other issue. In various examples, hardware configurations, software configurations, platforms, markets, and so on may be part of the categorization discussed above.

In one or more implementations, users and/or activities associated with one or more user activity logs may be anonymized. This may allow evaluation of the user activity logs and/or generation of testing scripts based thereon without enabling users and/or user specific information to be identified from such. In some examples, user activity logs may be able to be purged upon request such that such user activity logs are not used for generation of testing scripts and/or other activities where a purge request has been received.

In various implementations, the system 100 may affect the information that is logged in the user activity log(s) 102. For example, enhanced logging may be enabled to capture more information regarding user events within a software application or app than would be captured by the software application or app by default. The information that is logged in the user activity log(s) 102 may be tracked at an account level, device level, user level, and so on.

In some examples, the log analyzing device 101 may evaluate the user activity log(s) 102 and/or users and/or activities associated therewith against one or more activities and/or other thresholds. Such thresholds may include whether or not the use associated with the user activity log(s) 102 is positive or negative (i.e., whether no problem or issue occurs during use or whether some kind of problem or issue occurs during use), active time in the software application or app (such as more than 5 minutes, more than 10 minutes, and so on), active time watching and/or otherwise accessing video or other content (for a streaming and/or other content delivery software application or app) (such as more than 2 minutes, more than 5 minutes, and so on), a baseline number of features used (such as a program guide feature, a digital video recorder feature, a video on demand feature and so on for a streaming and/or other content delivery software application or app) leveraged (such as more than 3, more than 4, and so on), and so on. The log analyzing device 101 may use the user activity log or logs 102 that satisfy the thresholds and ignore those that do not (or vice versa).

In various examples, the log analyzing device 101 may identify one or more user activity logs 102 that are candidates for generating one or more testing scripts. For example, the log analyzing device 101 may identify one or more user activity logs 102 that represent common sequences of actions, categories, reported complaints and/or other issues, edge cases (a problem or situation that occurs only at an extreme (maximum, minimum, and so on) operating parameter), and so on.

In a number of examples, the automation testing device(s) 103 may test one or more testing scripts on different hardware configurations, software configurations, platforms, markets, and so on. The automation testing device(s) 103 may evaluate a complaint or other issue in this fashion to investigate whether the complaint and/or other issue applies to a specific and/or larger group of hardware configurations, software configurations, platforms, markets, and so on. This may enable evaluation of the potential impact of a complaint and/or other issue. In various examples, hardware configurations, software configurations, platforms, markets, and so on may be part of the categorization discussed above.

The system 100 may be used for a number of different purposes. In one example, the system 100 may be used to profile different kinds of usage (such as binge users of a streaming and/or other content delivery software application or app (users who access numerous episodes of a series in a single session), sports fans, digital video recorder super users (users who record and access a large amount of content using a digital video recorder), channel flippers (users who frequently scroll through a number of content options during a session), and so on). In other examples, the system 100 may be used for customer care, such as where a care agent receives a call or other communication or other notification and captures information such as account, device, date/time of complaint or other issue, and so on that may then be used to initiate automation testing. In still other examples, the system 100 may be used for load/performance testing, such as game day events like the Super Bowl, finales for shows such as Game of Thrones, a UFC (Ultimate Fighting Championship) fight, and so on. In yet other examples, the system 100 may be used to determine the severity of an issue, such as where an identified user activity log 102 is associated with a complaint or other issue or error that may be systemic across all hardware, specific to a model number and/or operating system version, and so on.

The log analyzing device 101 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, set top boxes, digital media players, cloud computing and/or other configuration of multiple electronic devices, and so on. The log analyzing device 101 may include one or more processors 104 and/or other processing units and/or controllers, one or more non-transitory storage media 105 (which may take the form of, but is not limited to, a magnetic storage medium; optical storage medium; magneto-optical storage medium; read only memory; random access memory; erasable programmable memory; flash memory; and so on), one or more communication units 106, and/or other components. The processing unit may execute instructions stored in the non-transitory storage medium to perform various functions. Such functions may include receiving and/or otherwise obtaining one or more user activity logs 102; evaluating one or more user activity logs 102; categorizing one or more users, activities in one or more user activity logs 102, one or more user activity logs, and so on; generating one or more testing scripts; testing one or more testing scripts using the automation testing device(s) 103; communicating with the automation testing device(s) 103 using the communication unit 106; and so on.

Similarly, automation testing device 103 may be any kind of electronic device. The electronic device may execute a testing automation framework and/or engine, such as Appium.

Although the system 100 is illustrated and described as including particular components arranged in a particular configuration, it is understood that this is an example. In a number of implementations, various configurations of various components may be used without departing from the scope of the present disclosure.

For example, the system 100 is illustrated and described as including a log analyzing device 101 that receives and/or otherwise obtains one or user activity logs 102. However, it is understood that this is an example. In various implementations, the log analyzing device 101 may itself log the user activity. In other implementations, a third party analytics engine, such as Google Analytics™ may be used to obtain information regarding the user activities. Various configurations are possible and contemplated without departing from the scope of the present disclosure.

Figure 2:
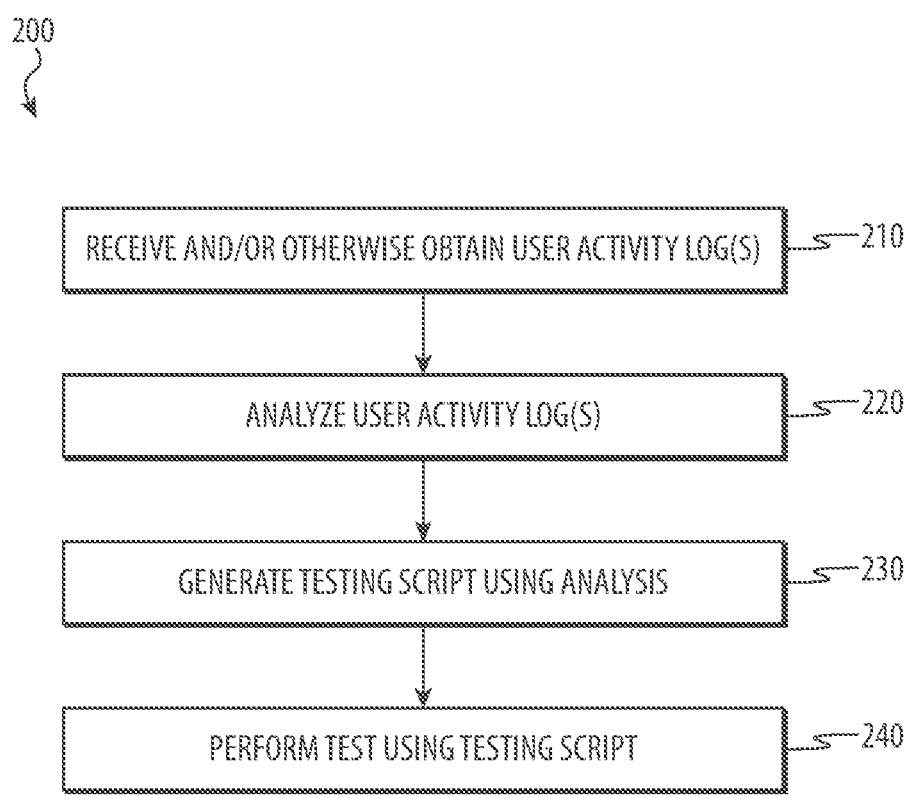
FIG. 2 depicts a flow chart illustrating a first example method for log-based automation testing. This method may be performed by the system of FIG. 1.

FIG. 2 depicts a flow chart illustrating a first example method 200 for log-based automation testing. This method 200 may be performed by the system 100 of FIG. 1.

At operation 210, an electronic device (such as the log analyzing device 101 and/or the automation testing device 103 of FIG. 1) may receive and/or otherwise obtain one or more user activity log(s). The user activity log(s) may be generated by one or more software applications or apps and/or one or more third party analytics engines, such as Google Analytics™, interacting with one or more users. For example, a user activity log for a software application or app may include information detailing a user's interactions with the software application or app during a session using the software application or app, such as input provided by the user, software application or app events, output provided to the user, user interface and/or other software application or app features accessed, software application or app reactions to the input, and so on.

At operation 220, the electronic device may analyze the user activity log(s). Analyzing the user activity log(s) may include analyzing a sequence of actions included in the user activity log(s), categorizing one or more of the actions and/or the sequence of actions, categorizing the user, consolidating one or more of the actions and/or the user activity log(s), comparing the user and/or the user activity log(s) and/or one or more of the actions and/or the sequence of actions to one or more categories, comparing the user and/or the user activity log(s) and/or one or more of the actions and/or the sequence of actions to one or more categories to one or more thresholds, statistically analyzing the user and/or the user activity log(s) and/or one or more of the actions and/or the sequence of actions to one or more categories, determining whether the user and/or the user activity log(s) and/or one or more of the actions and/or the sequence of actions to one or more categories is common to a population or an outlier, and so on. Various configurations are possible and contemplated without departing from the scope of the present disclosure.

At operation 230, the electronic device may generate one or more testing scripts using analysis. For example, the electronic device may generate a testing script that includes one or more of the actions and/or the sequence of actions included in the user activity log(s). By way of another example, the electronic device may generate a testing script by determining a category associated with the user activity log(s) and using the user activity log(s) to generate a testing script for the respective category. In yet another example, the electronic device may consolidate a group or set of the user activity logs and generate a testing script using the consolidated user activity log. Various configurations are possible and contemplated without departing from the scope of the present disclosure.

At operation 240, the electronic device may perform one or more tests using the testing script. In some examples, the electronic device may perform the one or more tests using a testing automation framework and/or engine, such as Appium.

By way of example, the electronic device may receive and/or otherwise obtain a user activity log associated with a streaming and/or other content delivery software application or app. The user activity log may include a sequence of actions corresponding to using a search tab to search for a show and selecting that show for viewing. The electronic device may analyze the user activity log, generate a testing script using the analysis, and perform a test using the testing script. In some examples, the testing script may include the sequence of actions and/or a portion thereof. Various configurations are possible and contemplated without departing from the scope of the present disclosure.

In various examples, this example method 200 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described at operation 240 as the electronic device performing one or more tests using the testing script. However, it is understood that this is an example. In other examples, the testing may be performed by one or more other electronic devices instead of and/or in addition to the electronic device. Various configurations are possible and contemplated without departing from the scope of the present disclosure.

Figure 3:
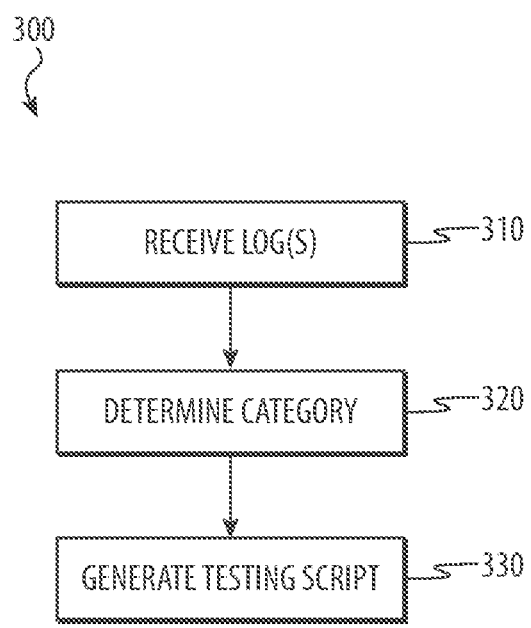
FIG. 3 depicts a flow chart illustrating a second example method for log-based automation testing. This method may be performed by the system of FIG. 1.

FIG. 3 depicts a flow chart illustrating a second example method 300 for log-based automation testing. This method 300 may be performed by the system 100 of FIG. 1.

At operation 310, an electronic device (such as the log analyzing device 101 and/or the automation testing device 103 of FIG. 1) may receive one or more user activity log(s). At operation 320, the electronic device may determine one or more categories associated with the user activity log(s). In some examples, the category may be determined by evaluating and/or otherwise analyzing one or more users associated with the user activity log(s). In various examples, the category may be determined by analyzing activity in the user activity log(s), such as one or more of a sequence of actions included in the user activity log(s), and/or the user activity log(s) themselves. In some implementations of such an example, analyzing the activity may include determining that the activity is statistically similar to category activity for the category. In a number of examples, determining the category may include retrieving a set of categories and comparing the user, the user activity log(s), one or more activities associated with the user activity log(s), and so on to the set of categories. Various configurations are possible and contemplated without departing from the scope of the present disclosure.

At operation 330, the electronic device may generate one or more testing scripts for the category. Such testing scripts may be used to perform one or more tests for the category.

By way of example, the electronic device may receive and/or otherwise obtain a user activity log associated with a streaming and/or other content delivery software application or app. The electronic device may determine a category associated with the user activity log, such as binge users, sports fans, digital video recorder super users, channel flippers, and so on. The electronic device may then generate one or more testing scripts associated with the determined category. Various configurations are possible and contemplated without departing from the scope of the present disclosure.

By way of example, the software application or app may be a software application or app other than a streaming and/or other content delivery software application or app. By way of illustration, the software application or app may be a software application or app operable to connect homeowners with prescreened, local service professionals to carry out home improvement, maintenance, and remodeling projects. Such a software application or app operable to connect homeowners with prescreened, local service professionals to carry out home improvement, maintenance, and remodeling projects may be associated with multiple categories of users, such as basic users (users associated with management of a single property), power users (users associated with management of ten or more properties), vendors (service professionals), and so on. In such an example, the electronic device may receive and/or otherwise obtain a user activity log associated with the software application or app operable to connect homeowners with prescreened, local service professionals to carry out home improvement, maintenance, and remodeling projects, determine a category associated with the user activity log, and generate one or more testing scripts associated with the determined category. Various configurations are possible and contemplated without departing from the scope of the present disclosure.

The electronic device may determine a category associated with the user activity log, such as binge users, sports fans, digital video recorder super users, channel flippers, and so on. The electronic device may then generate one or more testing scripts associated with the determined category. Various configurations are possible and contemplated without departing from the scope of the present disclosure.

In various examples, this example method 300 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 may include the additional operations of determining that multiple users associated with multiple user activity logs are associated with the category and consolidating the multiple user activity logs into a consolidated user activity log that may be used to generate one or more testing scripts. Various configurations are possible and contemplated without departing from the scope of the present disclosure.

Figure 4:
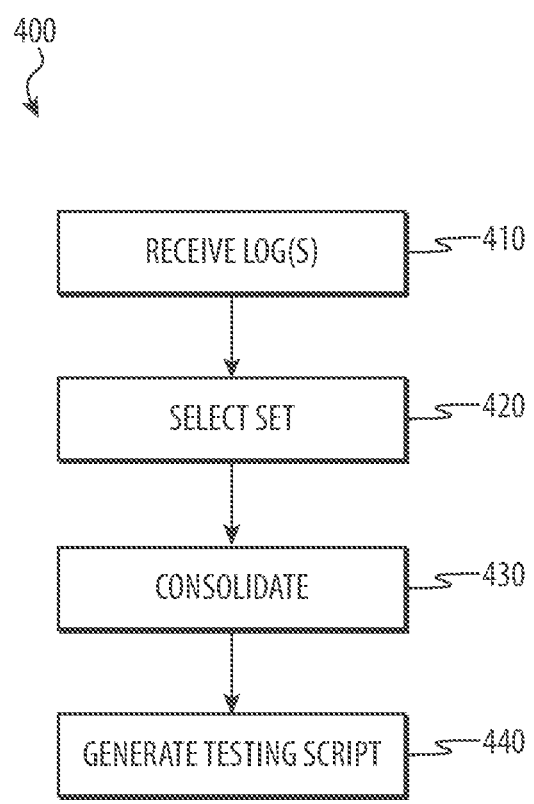
FIG. 4 depicts a flow chart illustrating a third example method for log-based automation testing. This method may be performed by the system of FIG. 1.

FIG. 4 depicts a flow chart illustrating a third example method 400 for log-based automation testing. This method 400 may be performed by the system 100 of FIG. 1.

At operation 410, an electronic device (such as the log analyzing device 101 and/or the automation testing device 103 of FIG. 1) may receive user activity logs. At operation 420, the electronic device may select a set of the user activity logs to consolidate. For example, the electronic device may select a set of the user activity logs to consolidate by determining that each of the set of the user activity logs are statistically similar (i.e., the set of the user activity logs primarily includes one or more activities and/or sequences of actions common to a majority or plurality of the user activity logs). By way of another example, the electronic device may select a set of the user activity logs to consolidate by determining that each of the set of the user activity logs (and/or users respectively associated therewith) are all associated with a category. In yet another example, the electronic device may select a set of the user activity logs to consolidate by evaluating sequences of actions respectively associated with the set of the user activity logs. In still another example, the electronic device may select a set of the user activity logs to consolidate by comparing an action in one of the user activity logs to an activity and/or other threshold.

At operation 430, the electronic device may consolidate the selected set of the user activity logs. Consolidating the selected set of the user activity logs may include removing one or more actions, adding one or more actions, modifying one or more actions, and so on. At operation 440, the electronic device may generate one or more testing scripts using the consolidated user activity logs.

By way of example, the electronic device may receive and/or otherwise obtain user activity logs associated with a streaming and/or other content delivery software application or app. The electronic device may select a set of the user activity logs, such as binge users. The electronic device may consolidate the set of the user activity logs. Consolidating the set of the user activity logs may include removing one or more actions, adding one or more actions, modifying one or more actions, and so on. By way of illustration, the majority of the set of the user activity logs may access an on demand menu to search for a show. However, a minority of the set of the user activity logs may instead access a search tab to search for a show and then select an on demand option for that show. As such, the electronic device may consolidate the majority of the set of the user activity logs associated with binge users with the minority of the set of the user activity logs associated with binge users by removing actions associated with accessing a search tab to search for a show and then selecting an on demand option for that show, adding actions associated with accessing an on demand menu to search for a show, modifying one or more actions by replacing actions associated with accessing a search tab to search for a show and then selecting an on demand option for that show with actions associated with accessing an on demand menu to search for a show. The electronic device may then generate one or more testing scripts using the consolidated user activity logs. Various configurations are possible and contemplated without departing from the scope of the present disclosure.

In various examples, this example method 400 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as selecting a set of the user activity logs at operation 420. However, it is understood that this is an example. In some implementations, the electronic device may consolidate all user activity logs, omit consolidating any user activity logs, and so on. Various configurations are possible and contemplated without departing from the scope of the present disclosure.

Figure 5:
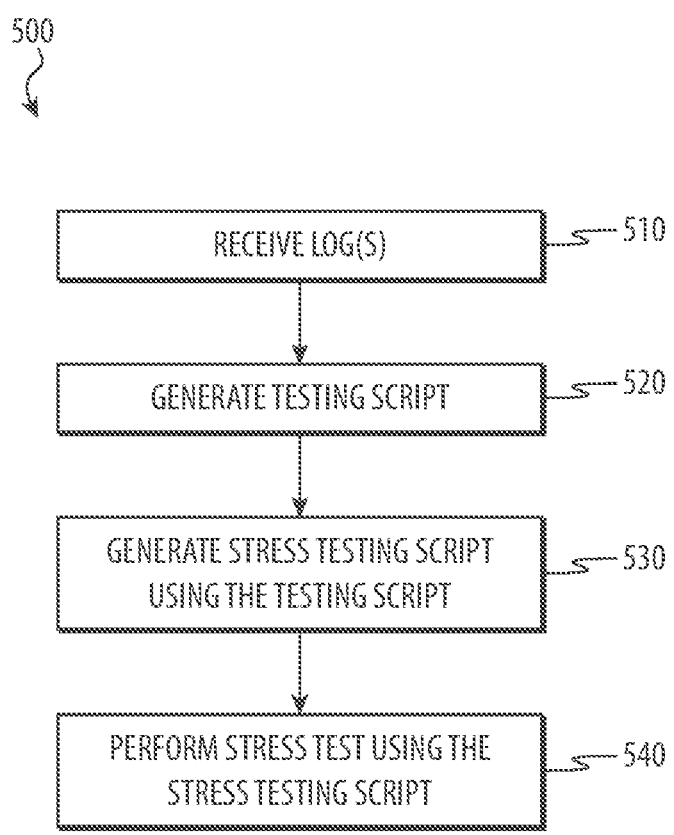
FIG. 5 depicts a flow chart illustrating a fourth example method for log-based automation testing. This method may be performed by the system of FIG. 1.

FIG. 5 depicts a flow chart illustrating a fourth example method 500 for log-based automation testing. This method 500 may be performed by the system 100 of FIG. 1.

At operation 510, an electronic device (such as the log analyzing device 101 and/or the automation testing device 103 of FIG. 1) may receive one or more user activity logs. At operation 520, the electronic device may generate one or more testing scripts using the one or more activity logs. At operation 530, the electronic device may generate one or more stress testing scripts using the testing script(s).

Generating the stress testing script may include modifying the testing script(s). For example, the electronic device may modify the testing script by determining a category associated with a number of the user activity log(s), selecting a different number, and modifying the testing script(s) by changing an activity level corresponding to the different number. Stated another way for purposes of illustration, the electronic device may determine that 100 users associated with a particular category are represented in the user activity logs. The electronic device may determine to generate a testing script that reflects a doubling of users of that category and may accordingly double the activity level from the testing script that is associated with those users. In this way, the stress testing script may be used to stress test a system to simulate what would happen if users of that particular category doubled. Various configurations are possible and contemplated without departing from the scope of the present disclosure.

In other examples, the electronic device may modify the testing script by determining a category of users associated with a number of the user activity logs, selecting a different number, and modifying the testing script by changing an activity level corresponding to the different number. Changing the activity level may include adding an activity to the stress testing script, removing an activity from the stress testing script, modifying activity of the stress testing script, and so on. Various configurations are possible and contemplated without departing from the scope of the present disclosure.

In yet other examples, the electronic device may modify the testing script by determining a category of activity associated with a number of the user activity logs, selecting a different number, and modifying the testing script by changing an amount of the activity corresponding to the different number. In still other examples, the electronic device may modify the testing script by adding duplicate activity from one or more of the user activity logs to the stress testing script. Various configurations are possible and contemplated without departing from the scope of the present disclosure.

At operation 540, the electronic device may perform one or more stress tests using the stress testing script(s).

By way of illustration, the electronic device may receive user activity logs associated with users of a streaming and/or other content delivery software application or app during a past event, such as a previous Super Bowl, a previous season finale of Game of Thrones, a previous UFC fight, and so on. The electronic device may generate a testing script that represents all of the user activity logs. The electronic device may then generate a stress testing script using the testing script, such as by doubling the number of users and/or activity associated with the user activity logs. The electronic device may then perform a stress test using the stress testing script to stress test a system for a future event (such as a subsequent Super Bowl, a subsequent season finale of Game of Thrones, a subsequent UFC fight, and so on) to see how the system will behave during such an event if the users and/or activity doubles. Various configurations are possible and contemplated without departing from the scope of the present disclosure.

In various examples, this example method 500 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as both generating a testing script and generating a stress testing script using the testing script. However, it is understood that this is an example. In some implementations, the method 500 may be used to generate a stress testing script without first generating a testing script. Various configurations are possible and contemplated without departing from the scope of the present disclosure.

Figure 6:
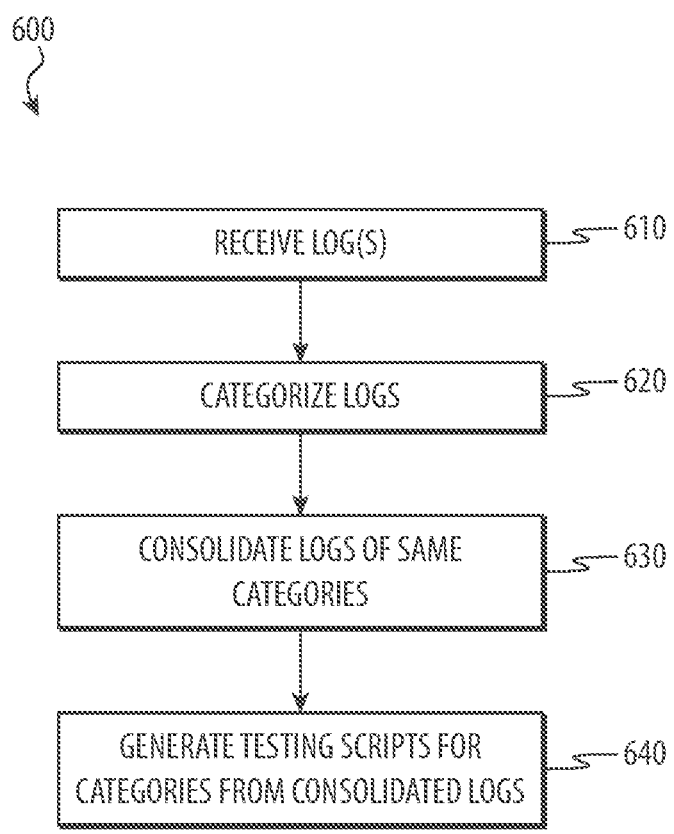
FIG. 6 depicts a flow chart illustrating a fifth example method for log-based automation testing. This method may be performed by the system of FIG. 1.

FIG. 6 depicts a flow chart illustrating a fifth example method 600 for log-based automation testing. This method 600 may be performed by the system 100 of FIG. 1.

At operation 610, an electronic device (such as the log analyzing device 101 and/or the automation testing device 103 of FIG. 1) may receive multiple user activity logs. At operation 620, the electronic device may categorize the user activity logs. At operation 630, the electronic device may consolidate user activity logs of same categories. At operation 640, the electronic device may generate testing scripts for one or more of the categories from consolidated user activity logs.

By way of example, the electronic device may receive and/or otherwise obtain user activity logs associated with a streaming and/or other content delivery software application or app. The electronic device may determine categories associated with one or more of the user activity logs, such as binge users, sports fans, digital video recorder super users, channel flippers, and so on. The electronic device may consolidate user activity logs associated with the same categories together (such as to generate a consolidated binge users user activity log, a consolidated sports fans user activity log, a consolidated digital video recorder super users user activity log, a consolidated channel flipper user activity logs, and so on). The electronic device may then generate one or more testing scripts associated with one or more of the consolidated user activity logs (such as a testing script for the consolidated binge users user activity log, a testing script for the consolidated sports fans user activity log, a testing script for the consolidated digital video recorder super users user activity log, a testing script for the consolidated channel flipper user activity logs, and so on). Various configurations are possible and contemplated without departing from the scope of the present disclosure.

In various examples, this example method 600 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as receiving multiple user activity logs at operation 610. However, it is understood that this is an example. In some implementations, the electronic device may itself generate the multiple user activity logs. In such an implementation, the operation 610 of receiving multiple user activity logs may be omitted. Various configurations are possible and contemplated without departing from the scope of the present disclosure.

Figure 7:
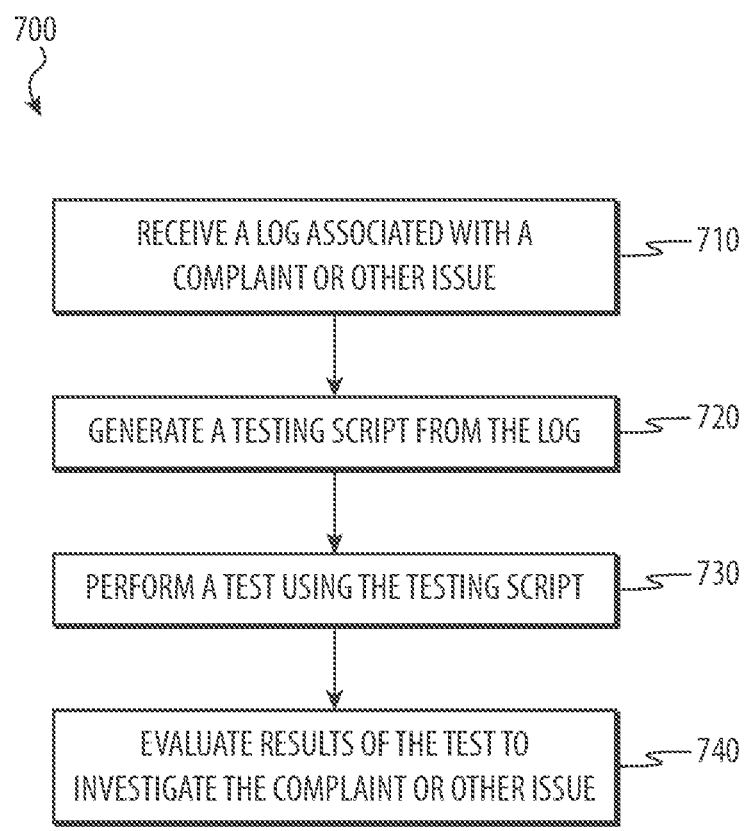
FIG. 7 depicts a flow chart illustrating a sixth example method for log-based automation testing. This method may be performed by the system of FIG. 1.

FIG. 7 depicts a flow chart illustrating a sixth example method 700 for log-based automation testing. This method 700 may be performed by the system 100 of FIG. 1.

At operation 710, an electronic device (such as the log analyzing device 101 and/or the automation testing device 103 of FIG. 1) may receive a user activity log associated with a complaint or other issue. At operation 720, the electronic device may generate a testing script from the user activity log. At operation 730, the electronic device may perform a test using the testing script. At operation 740, the electronic device may evaluate results of the test to investigate the complaint or other issue.

For example, a user may encounter an issue with a software application or app. The user may submit a complaint regarding the issue. A user activity log associated with the user's use of the application during the issue may be submitted along with the complaint. The electronic device may receive the user activity log, generate a testing script, and perform a test using the testing script to investigate the complaint. The electronic device may test the testing script on different hardware configurations, software configurations, platforms, markets, and so on. This may enable the electronic device to determine whether or not the complaint is caused by, relates to, and/or otherwise applies to a specific and/or larger group of hardware configurations, software configurations, platforms, markets, and so on. This may also enable the electronic device to determine the potential impact of a complaint and/or other issue due to involvement of a specific and/or larger group of hardware configurations, software configurations, platforms, markets, and so on. In various examples, hardware configurations, software configurations, platforms, markets, and so on may be part of the categorization discussed above. Various configurations are possible and contemplated without departing from the scope of the present disclosure.

In other examples, a complaint may not be submitted. By way of illustration, the software application or app may encounter an issue and submit an associated user activity log that the electronic device may use to generate a testing script and perform a test in order to investigate the issue without user involvement. Various configurations are possible and contemplated without departing from the scope of the present disclosure.

In various examples, this example method 700 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as generating a testing script from the user activity log at operation 720. However, it is understood that this is an example. In various implementations, the electronic device may use the user activity log as a testing script without separately generating a testing script. Various configurations are possible and contemplated without departing from the scope of the present disclosure.

Figure 8:
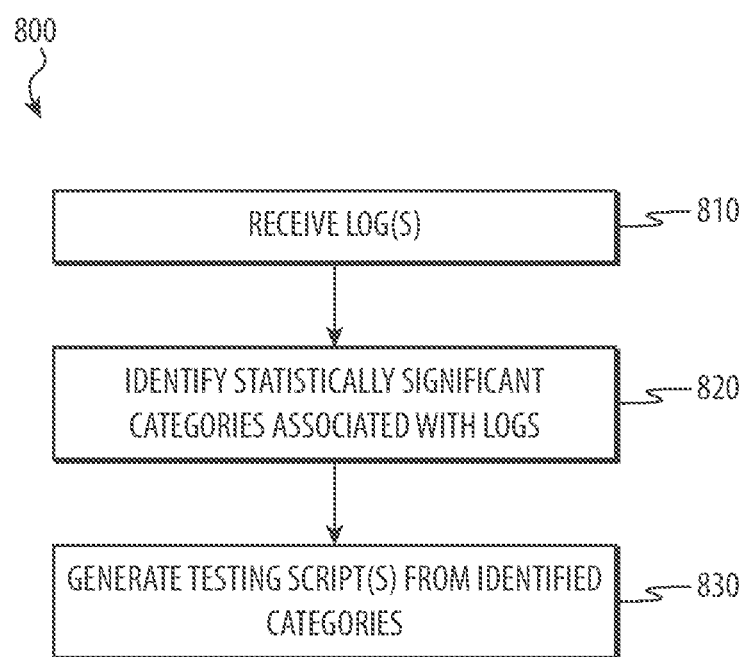
FIG. 8 depicts a flow chart illustrating a seventh example method for log-based automation testing. This method may be performed by the system of FIG. 1.

FIG. 8 depicts a flow chart illustrating a seventh example method 800 for log-based automation testing. This method 800 may be performed by the system 100 of FIG. 1.

At operation 810, an electronic device (such as the log analyzing device 101 and/or the automation testing device 103 of FIG. 1) may receive multiple user activity logs. At operation 820, the electronic device may identify one or more statistically significant categories associated with one or more of the user activity logs. For example, the electronic device may determine that statistically significant (such as more than 5%, more than 10%, and so on) numbers of groups of the user activity logs are statistically similar to each other and identify those groups of the activity logs as categories. In some examples, the electronic device may prompt an operator to provide names, labels, or similar identifiers for the identified category/categories.

At operation 830, the electronic device may generate one or more testing scripts from identified category/categories. The testing script(s) may be used to perform one or more tests for the identified category/categories.

In various examples, this example method 800 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as identifying statistically significant categories associated with the user activity log(s). However, it is understood that this is an example. In various implementations, categories may be identified by analyzing the user activity log(s) in any number of different ways. By way of illustration, the electronic device may identify a group of user activity logs that all include similar activities and collectively make up more than 15% of the total user activity logs. Various configurations are possible and contemplated without departing from the scope of the present disclosure.

Figure 9:
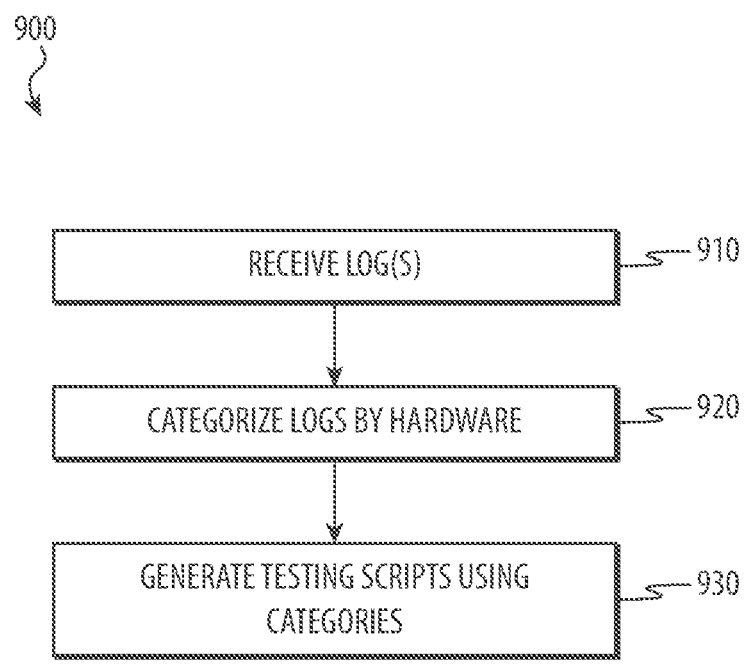
FIG. 9 depicts a flow chart illustrating an eighth example method for log-based automation testing. This method may be performed by the system of FIG. 1.

FIG. 9 depicts a flow chart illustrating an eighth example method 900 for log-based automation testing. This method 900 may be performed by the system 100 of FIG. 1.

At operation 910, an electronic device (such as the log analyzing device 101 and/or the automation testing device 103 of FIG. 1) may receive one or more user activity logs. At operation 920, the electronic device may categorize the user activity log(s) by hardware. At operation, 930, the electronic device may generate one or more testing scripts using the category or categories.

In various examples, this example method 900 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 900 is illustrated and described as including particular operations performed in a particular order, it is understood that this is an example. In various implementations, various orders of the same, similar, and/or different operations may be performed without departing from the scope of the present disclosure.

For example, the operation 920 is illustrated and described as categorizing the user activity log(s) by hardware. However, it is understood that this is an example. In some implementations, configurations other than hardware may be used for categorization. Such configurations may include one or more hardware configurations, software configurations, platforms, markets, and so on. Various options are possible and contemplated without departing from the scope of the present disclosure.

Figure 10:
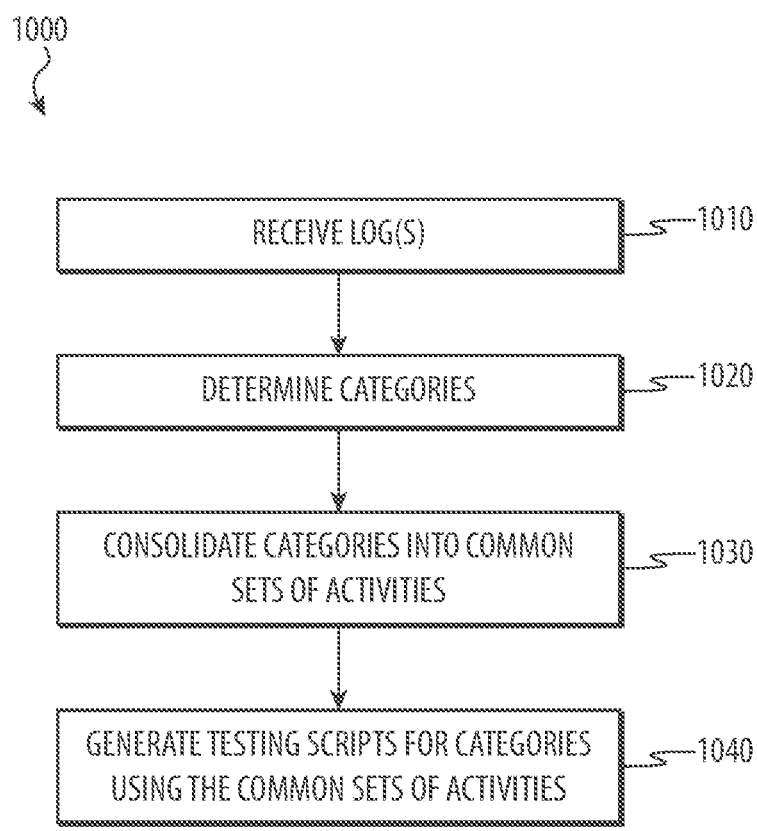
FIG. 10 depicts a flow chart illustrating a ninth example method for log-based automation testing. This method may be performed by the system of FIG. 1.

FIG. 10 depicts a flow chart illustrating a ninth example method 1000 for log-based automation testing. This method 1000 may be performed by the system 100 of FIG. 1.

At operation 1010, an electronic device (such as the log analyzing device 101 and/or the automation testing device 103 of FIG. 1) may receive multiple user activity logs. At operation 1020, the electronic device may determine one or more categories associated with the multiple user activity logs. At operation 1030, the electronic device may consolidate the categories of the user activity logs into common sets of activities. At operation 1040, the electronic device may generate one or more testing scripts for the categories using the common sets of activities.

By way of example, the electronic device may receive and/or otherwise obtain multiple user activity logs associated with a streaming and/or other content delivery software application or app. The electronic device may determine categories, such as binge users, sports fans, digital video recorder super users, channel flippers, and so on, associated with the user activity logs. The electronic device may consolidate user activity logs of each of the different categories into common sets of activities for the binge users category, sports fans category, digital video recorder super users category, channel flippers category, and so on. The electronic device may then generate one or more testing scripts for the binge users category, sports fans category, digital video recorder super users category, channel flippers category, and so on using the common sets of activities. Various configurations are possible and contemplated without departing from the scope of the present disclosure.

In various examples, this example method 1000 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 is illustrated and described as consolidating the categories of the user activity logs into common sets of activities. However, it is understood that this is an example. In some implementations, the user activity logs may be consolidated into common sets of activities without consideration of any category, and/or prior to categorization. Various configurations are possible and contemplated without departing from the scope of the present disclosure.

Figure 11:
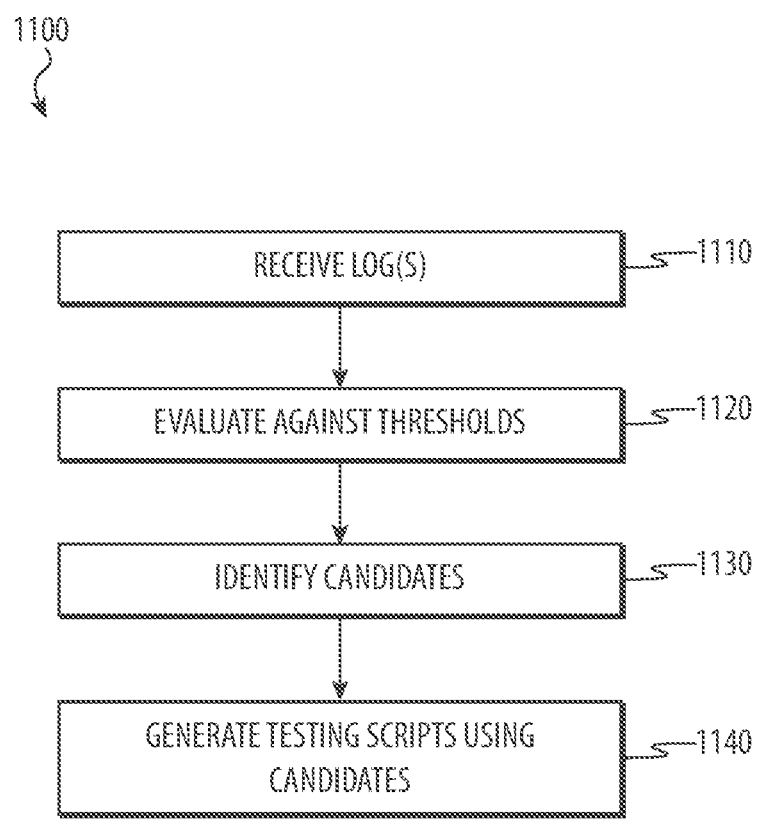
FIG. 11 depicts a flow chart illustrating a tenth example method for log-based automation testing. This method may be performed by the system of FIG. 1.

FIG. 11 depicts a flow chart illustrating a tenth example method 1100 for log-based automation testing. This method 1100 may be performed by the system 100 of FIG. 1.

At operation 1110, an electronic device (such as the log analyzing device 101 and/or the automation testing device 103 of FIG. 1), may receive multiple user activity logs. At operation 1120, the electronic device may evaluate the user activity logs against one or more thresholds. Such thresholds may include whether or not the use associated with the user activity log(s) is positive or negative (i.e., whether no problem or issue occurs during use or whether some kind of problem or issue occurs during use), active time in the software application or app (such as more than 5 minutes, more than 10 minutes, and so on), active time watching and/or otherwise accessing video or other content (for a streaming and/or other content delivery software application or app) (such as more than 2 minutes, more than 5 minutes, and so on), a baseline number of features used (such as a program guide feature, a digital video recorder feature, a video on demand feature and so on for a streaming and/or other content delivery software application or app) leveraged (such as more than 3, more than 4, and so on), and so on.

The electronic device may determine which of the user activity logs (if any) satisfy the thresholds. The electronic device may ignore user activity logs that do not satisfy the thresholds. Alternatively, the electronic device may ignore user activity logs that do satisfy the thresholds At operation 1130, the electronic device may identify one or more candidates for generating one or more testing scripts. The electronic device may identify the candidate(s) using the evaluation of the user activity logs against the one or more thresholds. For example, the electronic device may identify the user activity logs that do satisfy the thresholds as candidates for generating one or more testing scripts. Alternatively, the electronic device may identify the user activity logs that do not satisfy the thresholds as candidates for generating one or more testing scripts. In various implementations, the electronic device may consider other factors beyond satisfaction of the one or more thresholds for identifying one or more candidates for generating one or more testing scripts. By way of illustration, the electronic device may select the shorter of two user activity logs as a candidate for generating a testing script when both of the two user activity logs satisfy the one or more thresholds. Various configurations are possible and contemplated without departing from the scope of the present disclosure.

At operation 1140, the electronic device may generate one or more testing scripts using the candidate(s).

In various examples, this example method 1100 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 1100 is illustrated and described as including particular operations performed in a particular order, it is understood that this is an example. In various implementations, various orders of the same, similar, and/or different operations may be performed without departing from the scope of the present disclosure.

For example, the method 1100 illustrates and describes evaluating the user activity logs against the one or more thresholds and identifying the candidate(s) as separate, linearly performed operations. However, it is understood that this is an example. In other implementations, these operations may be combined into a single operation, performed in other orders, and so on. Various configurations are possible and contemplated without departing from the scope of the present disclosure.

Figure 12:
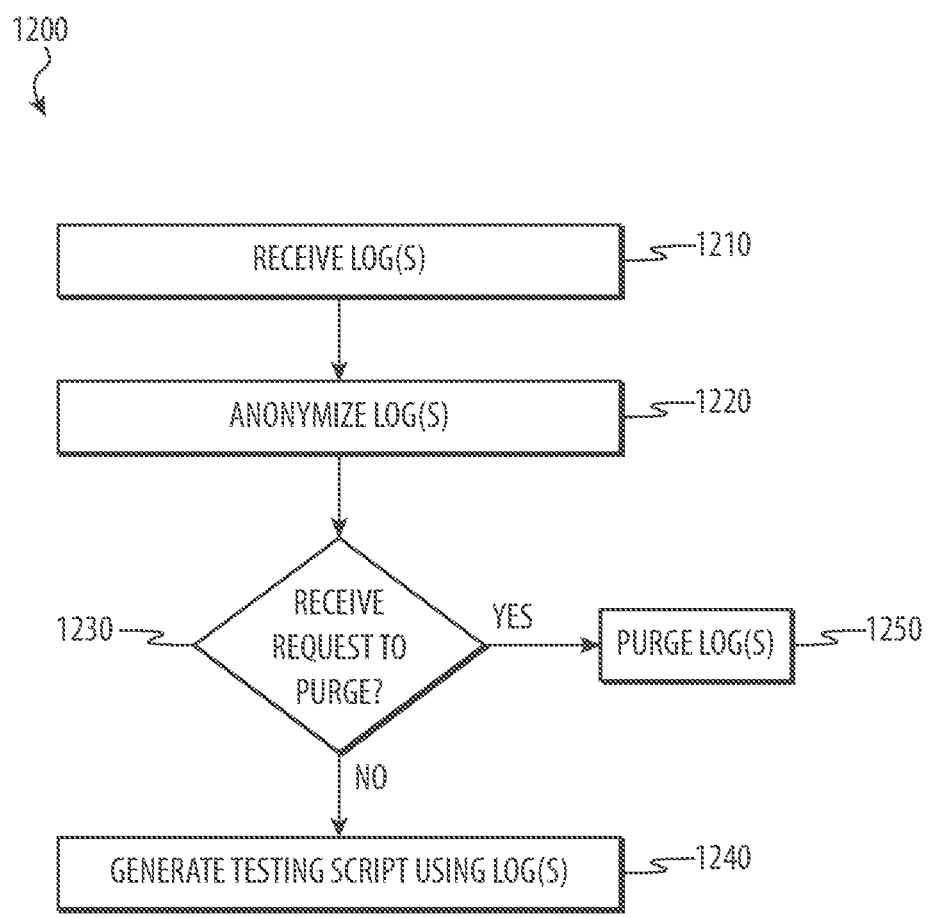
FIG. 12 depicts a flow chart illustrating an eleventh example method for log-based automation testing. This method may be performed by the system of FIG. 1.

FIG. 12 depicts a flow chart illustrating an eleventh example method 1200 for log-based automation testing. This method 1200 may be performed by the system 100 of FIG. 1.

At operation 1210, an electronic device (such as the log analyzing device 101 and/or the automation testing device 103 of FIG. 1), may receive one or more user activity log(s). At operation 1220, the electronic device may anonymize the user activity log(s). Anonymizing the user activity logs may involve removing and/or otherwise modifying any information that may be used to identify the user(s) (such as names, addresses, internet addresses and/or identifiers, telephone numbers, other identifiers, and so on). Anonymizing the user activity logs may be performed in such a way that the activities performed by the user(s) may remain even after information that may be used to identify the user(s) has been removed and/or otherwise modified.

At operation 1230, the electronic device may determine whether or not a request to purge one or more user activity logs is received. If not, the flow may proceed to operation 1240 where the electronic device may generate one or more testing scripts using the one or more user activity log(s).

Otherwise, the flow may proceed to operation 1250, where the electronic device may purge the one or more user activity logs as requested.

In various examples, this example method 1200 may be implemented as a group of interrelated software modules or components that perform various functions discussed herein. These software modules or components may be executed within a cloud network and/or by one or more computing devices, such as the log analyzing device 101 and/or the automation testing device 103 of FIG. 1.

Although the example method 1200 is illustrated and described as including particular operations performed in a particular order, it is understood that this is an example. In various implementations, various orders of the same, similar, and/or different operations may be performed without departing from the scope of the present disclosure.

For example, the method 1200 is illustrated and described as either purging one or more user activity logs in response to a request for generating a testing script using one or more user activity logs. However, it is understood that this is an example. In some implementations, multiple user activity logs may be received and some of the multiple user activity logs may be purged in response to one or more requests before one or more testing scripts are generated using one or more remaining user activity logs. Various configurations are possible and contemplated without departing from the scope of the present disclosure.

Further, anonymizing one or more user logs is illustrated and described with respect to the method 1200. However, it is understood that this is an example. In various implementations, such anonymizing may be used in the context of one or more of the methods 200-1100, the system 100, and so on. Various configurations are possible and contemplated without departing from the scope of the present disclosure.

Although the above illustrates and describes a number of embodiments, it is understood that these are examples. In various implementations, various techniques of individual embodiments may be combined without departing from the scope of the present disclosure.

In various implementations, a method for log-based automation testing may include receiving, using at least one processing unit, at least one user activity log associated with at least one user; determining a category for the at least one user, using the at least one processing unit; and generating, using the at least one processing unit, a testing script for the category using at least the at least one user activity log.

In some examples, the category for the at least one user may be determined by evaluating the at least one user. In various examples, the category for the at least one user may be determined by analyzing activity in the at least one user activity log. In some such examples, analyzing the activity may include determining that the activity is statistically similar to category activity for the category.

In a number of examples, the method further may further include determining that multiple users associated with multiple user activity logs are associated with the category and consolidating the multiple user activity logs into the at least one user activity log. In some examples, the method may further include generating categories by analyzing multiple user activity logs. In various examples, determining the category for the at least one user may include retrieving a set of categories and comparing the at least one user to the set of categories.

In some implementations, a method for log-based automation testing may include receiving, using at least one processing unit, user activity logs generated by an application based on interaction with users; selecting a set of the user activity logs to consolidate; consolidating the set of the user activity logs into a consolidated user activity log using the at least one processing unit; and generating, using the at least one processing unit, a testing script based at least on the consolidated user activity log.

In various examples, selecting the set of the user activity logs to consolidate may include determining that each of the set of the user activity logs are statistically similar. In a number of examples, selecting the set of the user activity logs to consolidate may include determining the user activity logs in the set of the user activity logs are all associated with a category. In some examples, selecting the set of the user activity logs to consolidate may include evaluating sequences of actions respectively associated with the set of the user activity logs. In various examples, selecting the set of the user activity logs to consolidate may include comparing an action in a user activity log to an activity threshold.

In some examples, consolidating the set of the user activity logs into the consolidated user activity log may include removing an action. In various examples, consolidating the set of the user activity logs into the consolidated user activity log may include adding an action.

In a number of implementations, a method for log-based automation testing may include receiving, using at least one processing unit, user activity logs generated by an application based on interaction with users associated with a past event; generating, using the at least one processing unit, a testing script based at least on the user activity logs; generating a stress testing script by modifying the testing script using the at least one processing unit; and using the stress testing script to stress test a system for a future event.

In some examples, modifying the testing script may include determining a category of users associated with a number of the user activity logs, selecting a different number, and modifying the testing script by changing an activity level corresponding to the different number. In a number of such examples, changing the activity level may include adding an activity to the stress testing script. In some such examples, changing the activity level may include removing an activity from the stress testing script.

In various examples, modifying the testing script may include determining a category of activity associated with a number of the user activity logs, selecting a different number, and modifying the testing script by changing an amount of the activity corresponding to the different number. In a number of examples, modifying the testing script may include adding duplicate activity from one of the user activity logs to the stress testing script.

As described above and illustrated in the accompanying figures, the present disclosure relates to using a testing engine and/or other machine learning and artificial intelligence to evaluate one or more user activity logs associated with one or more users and/or one or more software applications or apps. The testing engine may generate one or more testing scripts based on one or more sequences of activities in the one or more user activity logs. Such testing scripts may then be used to perform one or more tests, such as using a testing automation framework and/or engine.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method, comprising:
   receiving multiple user activity logs;
   identifying one or more statistically significant categories associated with one or more of the multiple user activity logs; and
   generating one or more testing scripts based on the one or more statistically significant categories, the generating including generating the one or more testing scripts based on the one or more of the multiple user activity logs associated with the statistically significant categories.

2. The method of claim 1, wherein the multiple user activity logs are generated by an application based on interaction with users.

3. The method of claim 1, further comprising performing a test based on the one or more testing scripts.

4. The method of claim 3, further comprising consolidating the user activity logs and performing the test based on the consolidated user activity logs.

5. The method of claim 3, wherein the test is performed by an automation engine.

6. The method of claim 1, further comprising anonymizing at least a portion of the multiple user activity logs.

7. The method of claim 1, further comprising generating a stress testing script by changing a level of activity represented in the user activity logs.

8. The method of claim 1, further comprising prompting a user to provide names, labels, or identifiers for the statistically significant categories.

9. The method of claim 1, wherein identifying the statistically significant categories includes identifying categories associated with one or more user activity logs that make up more than a threshold percentage of total user activity logs.

10. A non-transitory computer storage medium having stored therein programming instructions that, when executed by one or more processors of an electronic device, cause the electronic device to perform operations comprising:
    receiving multiple user activity logs;
    identifying one or more statistically significant categories associated with one or more of the multiple user activity logs; and
    generating one or more testing scripts based on the one or more statistically significant categories, the generating including generating the one or more testing scripts based on the one or more of the multiple user activity logs associated with the statistically significant categories.

11. The non-transitory computer storage medium of claim 10, wherein the operations further comprise performing a test based on the one or more testing scripts.

12. The non-transitory computer storage medium of claim 11, wherein the operations further comprise consolidating the user activity logs and performing the test based on the consolidated user activity logs.

13. The non-transitory computer storage medium of claim 11, wherein the test is performed by an automation engine.

14. The non-transitory computer storage medium of claim 10, wherein the operations further comprise generating a stress testing script by changing a level of activity represented in the user activity logs.

15. The non-transitory computer storage medium of claim 10, wherein the operations further comprise prompting a user to provide names, labels, or identifiers for the statistically significant categories.

16. The non-transitory computer storage medium of claim 10, wherein identifying the statistically significant categories includes identifying categories associated with one or more user activity logs that make up more than a threshold percentage of total user activity logs.

17. A system comprising:
    one or more processors; and
    programming instructions that, when executed by the one or more processors cause the system to perform operations including:
       receiving multiple user activity logs;
       identifying one or more statistically significant categories associated with one or more of the multiple user activity logs; and
       generating one or more testing scripts based on the one or more statistically significant categories, the generating including generating the one or more testing scripts based on the one or more of the multiple user activity logs associated with the statistically significant categories.

18. The system of claim 17, wherein the operations further include generating a stress testing script by changing a level of activity represented in the user activity logs.

19. The system of claim 17, wherein the operations further include prompting a user to provide names, labels, or identifiers for the statistically significant categories.

20. The system of claim 17, wherein identifying the statistically significant categories includes identifying categories associated with one or more user activity logs that make up more than a threshold percentage of total user activity logs.

* * * * *